(12) United States Patent
Mathison et al.

(10) Patent No.: US 12,041,671 B2
(45) Date of Patent: Jul. 16, 2024

(54) SYSTEMS AND METHODS FOR INDICATING THE PRESENCE OF A MULTI-ACCESS EDGE COMPUTING APPLICATION

(71) Applicant: Verizon Patent and Licensing Inc., Basking Ridge, NJ (US)

(72) Inventors: James Mathison, Warren, NJ (US); Andrew E. Youtz, Princeton, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 24 days.

(21) Appl. No.: 17/480,225

(22) Filed: Sep. 21, 2021

(65) Prior Publication Data
US 2023/0093193 A1   Mar. 23, 2023

(51) Int. Cl.
| | | |
|---|---|---|
| *G06F 15/16* | (2006.01) | |
| *G06F 3/04817* | (2022.01) | |
| *H04W 76/10* | (2018.01) | |
| *H04L 67/10* | (2022.01) | |
| *H04L 67/14* | (2022.01) | |
| *H04L 67/564* | (2022.01) | |
| *H04L 69/14* | (2022.01) | |
| *H04W 12/086* | (2021.01) | |

(52) U.S. Cl.
CPC ........ *H04W 76/10* (2018.02); *G06F 3/04817* (2013.01); *H04L 67/10* (2013.01); *H04L 67/14* (2013.01); *H04L 67/564* (2022.05); *H04L 69/14* (2013.01); *H04W 12/086* (2021.01)

(58) Field of Classification Search
CPC . H04W 76/10; H04W 12/086; G06F 3/04817; H04L 67/10; H04L 67/564; H04L 69/14; H04L 67/14
See application file for complete search history.

(56) References Cited

U.S. PATENT DOCUMENTS

| | | | | |
|---|---|---|---|---|
| 9,173,104 | B2 * | 10/2015 | Raleigh | H04W 88/08 |
| 10,694,439 | B2 * | 6/2020 | Mukherjee | H04W 36/08 |
| 11,050,813 | B2 * | 6/2021 | Sabella | H04L 67/10 |
| 11,218,438 | B2 * | 1/2022 | Dao | H04L 61/4511 |
| 11,729,243 | B2 * | 8/2023 | Oyman | H04N 19/597 709/219 |

(Continued)

FOREIGN PATENT DOCUMENTS

| | | | | |
|---|---|---|---|---|
| CN | 114615154 A | * | 6/2022 | |
| EP | 3409044 B1 | * | 4/2020 | ........ H04W 36/0016 |

(Continued)

*Primary Examiner* — Lance Leonard Barry
*Assistant Examiner* — Thorne E Waugh

(57) ABSTRACT

A user equipment (UE) device may include a processor configured to establish an application session with a multi-access edge computing (MEC) device via a base station. The processor may be further configured to receive a message associated with the application session; retrieve, from the received message, an indication that a MEC indicator on a user interface of the UE device should be activated, wherein the MEC indicator indicates that a MEC application session is active on the UE device; and activate the MEC indicator on the user interface of the UE device, in response to retrieving the indication.

20 Claims, 11 Drawing Sheets

(56) References Cited

U.S. PATENT DOCUMENTS

| | | | | |
|---|---|---|---|---|
| 2015/0304429 A1* | 10/2015 | Martens | ................. | H04L 67/12 |
| | | | | 709/202 |
| 2016/0112462 A1* | 4/2016 | Silver | ................. | H04L 65/104 |
| | | | | 709/217 |
| 2017/0118311 A1* | 4/2017 | Frydman | ........... | H04W 36/0011 |
| 2019/0045409 A1* | 2/2019 | Rasanen | ............... | H04W 36/36 |
| 2020/0345442 A1* | 11/2020 | Gerstner | ................ | B25J 9/1679 |
| 2021/0044675 A1* | 2/2021 | Frydman | ............... | H04W 8/005 |
| 2021/0409335 A1* | 12/2021 | Zhu | ........................ | H04L 47/24 |
| 2022/0191100 A1* | 6/2022 | Kim | ................... | H04L 61/4511 |
| 2023/0088955 A1* | 3/2023 | Kim | ...................... | H04W 76/30 |
| | | | | 370/329 |
| 2023/0093193 A1* | 3/2023 | Mathison | ............ | G06F 3/04817 |
| | | | | 709/227 |
| 2023/0403731 A1* | 12/2023 | Sabella | ............ | H04W 36/0072 |

FOREIGN PATENT DOCUMENTS

| | | | | |
|---|---|---|---|---|
| EP | 3968675 A1 * | 3/2022 | ............. | H04L 45/64 |
| WO | WO-2017043204 A1 * | 3/2017 | ............ | H04W 48/08 |
| WO | WO-2021029513 A1 * | 2/2021 | | |

* cited by examiner

SYSTEMS AND METHODS FOR INDICATING THE PRESENCE OF A MULTI-ACCESS EDGE COMPUTING APPLICATION

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. A wireless access network may manage a large number of user devices. The user devices may request different types of services. Managing all the various types of services, user devices, and enterprises poses various challenges.

DETAILED DESCRIPTION OF EMBODIMENTS

Figure 1:
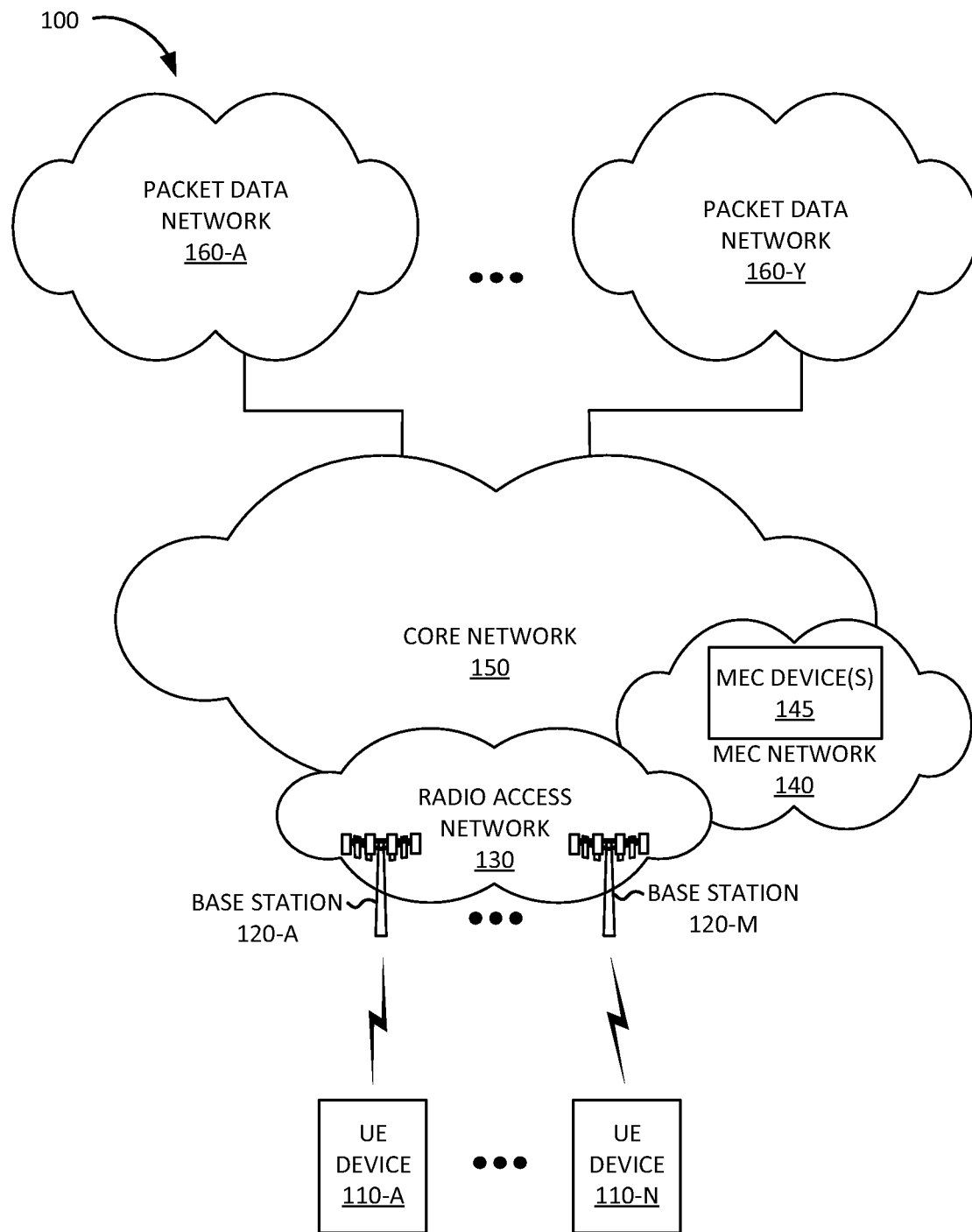
FIG. 1 illustrates an environment according to an implementation described herein.

The following detailed description refers to the accompanying drawings. The same reference numbers in different drawings identify the same or similar elements.

An important aspect of wireless communication services in Fifth Generation (5G) mobile networks is the implementation and use of Multi-Access Edge Computing (MEC) architecture. The MEC architecture includes devices and associated connections located at the network edge relative to the point of attachment of a wireless user equipment (UE) device to a wireless communication network via a base station. Thus, the MEC network may be located in geographic proximity to the base station and be close to the base station from a network topology perspective. The devices in a MEC network may implement services previously implemented in a core network and/or a data network (e.g., a cloud computing center in the data network) and enable processing to be offloaded from the core network and/or cloud computing center at a reduced latency.

Thus, an application running on a MEC server device in a MEC network may result in a lower latency than if the application were running on an application server away from the provider edge (e.g., in a data center reachable through a core network of the provider). Because a user of a UE device may not be aware of whether an application is using a MEC service, the MEC service may result in a confusing user experience. For example, in order to meet latency requirements, a video streaming application may be limited to a resolution of 720p from a non-MEC source. However, a content provider may select to use the MEC source for a better user experience. If the video streaming application is connected to a MEC server device and receives a video stream from a MEC source, the video streaming application may receive content with a 4K video resolution. A user may not be aware that the video streaming application is connected to a MEC server device and may sometimes perceive a high video quality, when the video streaming application is connected to a MEC server device, and a lower video quality, when the video streaming application is not connected to a MEC server device, without knowing why this is the case. This may result in a confusing experience for the user and/or lead the user to contact the customer service, wasting network and human resources.

Implementations described herein relate to systems and method for indicating the presence of a MEC application. A UE device may be configured to display a MEC indicator, such as a MEC icon, a modification of another icon, and/or another modification of a user interface to indicate the presence of an active MEC session. For example, a displayed icon may be modified by changing a foreground color of the displayed icon, by changing a background color of the displayed icon, by adding a border to the displayed icon, by making the displayed icon blink, and/or modifying the displayed icon in another way. In some implementation, a MEC indicator may include a non-visual indication additionally, or alternatively, to a visual indication. For example, a MEC indicator may include an audible indication and/or a haptic indication of the presence of an active MEC session.

A UE device may be configured to establish an application session with a MEC server device via a base station, receive a message associated with the application session, retrieve, from the message, an indication that a MEC indicator on a user interface of the UE device should be activated, and activate the MEC indicator on the user interface of the UE device in response to retrieving the indication. At a later time, the UE device may receive an indication that the application session has ended or is no longer being routed to the MEC server device and may, in response, deactivate the MEC indicator.

In some implementations, the message may include a Protocol Configurations Options (PCO) message or an extended PCO (ePCO) message and the UE device may determine that a particular field of the PCO or ePCO message includes an indication that the MEC indicator should be activated. The particular field may include an existing PCO/ePCO container or a PCO/ePCO container dedicated to include information indicating a communication session is a MEC session. The PCO/ePCO message may be generated by a network device in response to the network device determining that a communication session is a MEC session. For example, the PCO/ePCO message may be received from a Session Management Function (SMF) that is associated with a User Plane Function (UPF) that routes traffic associated with the application session to the MEC server device.

In other implementations, a MEC session may be associated with a MEC Class of Service (CoS) identifier (ID), such as a Quality of Service (QoS) Class Flow Identifier (QFI) and/or another type of CoS ID. Thus, the message may include a PDU that is received from a MEC server device associated with the MEC session, and the PDU may include the MEC CoS ID in the header. The UE device may detect the MEC CoS ID in the PDU, determine that a MEC session is active, and activate the MEC indicator in response.

In yet other implementations, the message may be received from a UE route selection profile (URSP) module on the UE device. The URSP may include a policy for selecting different data networks for different types of PDU sessions and the URSP module may be configured to use the URSP to select a MEC network for particular applications and/or particular types of PDU sessions. Thus, when the URSP module selects a MEC network as the destination data network for a PDU session, the URSP module generate a message to inform the user interface of the UE device to activate a MEC indicator.

In some implementations, when a UE device has multiple applications running, if at least one of the applications is associated with a MEC session, the UE device may activate the MEC indicator. In other implementations, when the UE device has multiple applications running, the UE device may activate the MEC indicator if an application associated with the MEC session is in the foreground of the user interface, and may deactivate the MEC indicator if the user switches the application associated with the MEC session to the background.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, MEC network 140 (which includes MEC devices 145), core network 150, and packet data networks (PDNs) 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for IoT applications. UE device 110 may detect an active MEC session and may activate a MEC indicator in the user interface to inform the user that UE device 110 is using a MEC service.

RAN 130 may include base stations 120. Base station 120 may be configured for one or more Radio Access Technology (RAT) types. For example, base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices 110 using a 5G NR air interface, a 4G LTE air interface, and/or using another type of cellular air interface. Base station 120 may enable UE device 110 to communicate with core network 150.

MEC network 140 may be associated with one or more base stations 120 and may provide MEC services for UE devices 110 attached to the base stations 120. MEC network 140 may be in proximity to base stations 120 from a geographic and network topology perspective, thus enabling low latency communication with UE devices 110 and/or base stations 120. As an example, MEC network 140 may be located on the same site as base station 120. As another example, MEC network 140 may be geographically closer to base station 120, and reachable via fewer network hops and/or fewer switches, than other base stations 120.

MEC network 140 may include one or more MEC devices 145 (also referred to herein as "MEC server devices 145"). MEC devices 145 may provide MEC services to UE devices 110. A MEC service may include, for example, a low-latency microservice associated with a particular application, such as, for example, a user authentication microservice, a navigation microservice, an online shopping microservice, a content delivery microservice, a gaming microservice, a virtual and/or augmented reality microservice, a health monitoring microservice, and/or another type of microservice associated with a low latency requirement. As another example, a MEC service may include a microservice associated with a virtualized network function (VNF) of core network 150. As yet another example, a MEC service may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphics information and/or other types of parallel processing, and/or other types of cloud computing services.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. In some implementations, core network 150 may include a 5G core network. Exemplary components of a 5G core network are described below with reference to FIG. 2. In other implementations, core network 150 may include a 4G core network (e.g., an evolved packet core (EPC) network). Exemplary components of a 4G core network are described below with reference to FIG. 3. Core network 150 may provide an indication to UE device 110 that UE device 110 is connected to MEC network 140 and associated with an active MEC session.

The components of core network 150 may be implemented as dedicated hardware components or as virtualized functions implemented on top of a common shared physical infrastructure using Software Defined Networking (SDN). For example, an SDN controller may implement one or more of the components of core network 150 using an adapter implementing a VNF virtual machine, a Cloud Native Function (CNF) container, an event driven serverless architecture interface, and/or another type of SDN component. The common shared physical infrastructure may be implemented using one or more devices 400 described below with reference to FIG. 4 in a cloud computing center associated with core network 150. Additionally, or alternatively, some, or all, of the shared physical infrastructure may be implemented using one or more devices 400 implemented in MEC device 145 in MEC network 140.

PDNs 160-A to 160-Y may each include a PDN. A particular PDN 160 may be associated with a Data Network Name (DNN) in 5G, and/or an Access Point Name (APN) in 4G, and a UE device may request a connection to PDN 160 using the DNN or APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
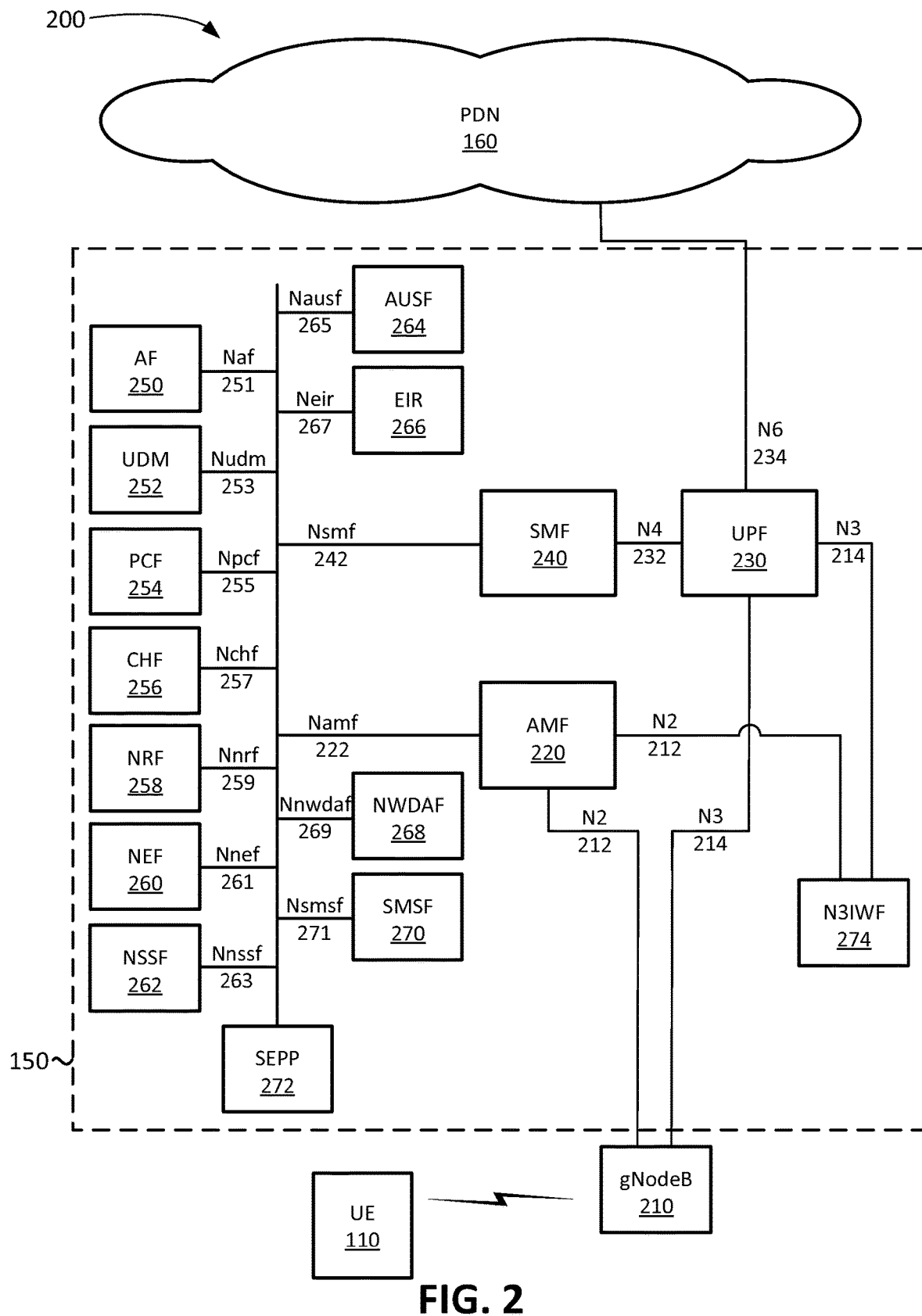
FIG. 2 is a diagram illustrating exemplary components of a Fifth Generation (5G) core network according to an implementation described herein.

FIG. 2 illustrates a system 200 that includes exemplary components of core network 150 in the context of environment 100 according to an implementation described herein. As shown in FIG. 2, system 200 may include UE device 110, gNodeB 210, core network 150, and PDN 160.

gNodeB 210 (corresponding to base station 120) may include devices (e.g., base stations) and components that enable UE device 110 to connect to core network 150 via RAN 130 using 5G NR Radio Access Technology (RAT). For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214.

Core network 150 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 150 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

AMF 220 may perform registration management, connection management, reachability management, mobility management, lawful intercepts, Short Message Service (SMS) transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network (e.g., PDN 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242. SMF may send a PCO message to UE device 110 via AMF 220. The PCO message may include information indicating that UE device 110 is using MEC network 140.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251, also referred to as an NG5 interface. AF 250 may request a policy for a particular application by sending the request to PCF 254 via NEF 260 and PCF 254 may install the policy on SMF 240 managing a session associated with AF 250. The policy may include a request to direct particular types of traffic associated with AF 250 to MEC network 140.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. For example, PCF 254 may install a policy on SMF 240 to send an indication of an active MEC session to UE device 110 in a PCO message, when UE device 110 is associated with an active MEC session.

CHF 256 may perform charging and/or billing functions for core network 150. For example, CHF 256 may generate a charging record for UE device 110 based on data flow information associated with UE device 110. CHF 256 may be accessible via Nchf interface 257. CHF 256 may receive data flow information from UPF 230 via SMF 240. Furthermore, CHF 256 may receive policy information relating to policies applied to data flows associated with UE device 110 from PCF 254.

NRF 258 may support a service discovery function and maintain profiles of available network function (NF) instances and their supported services. An NF profile may include, for example, an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. NRF 258 may be accessible via an Nnrf interface 259.

NEF 260 may expose capabilities and events to other NFs, including 3rd party NFs, AFs, edge computing NFs, and/or other types of NFs. Furthermore, NEF 260 may secure provisioning of information from external applications to core network 150, translate information between core network 150 and devices/networks external to core network 150, support a Packet Flow Description (PFD) function, and/or perform other types of network exposure functions. NEF 260 may be accessible via Nnef interface 261.

NSSF 262 may select a set of network slice instances to serve a particular UE device 110, determine a network slice ID, such as, for example, network slice selection assistance information (NSSAI), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via Neir interface 267.

NWDAF 268 may collect analytics information associated with radio access network 120 and/or core network 150. For example, NWDAF 268 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi Access Point. N3IWF 274 may facilitate handovers for UE device 110 between radio access network 120 and the non-3GPP access device. N3IWF 274 maybe accessible via Nn3iwf interface 275.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150. For example, core network 150 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 150 may include a reference point architecture that includes point-to-point interfaces between particular function nodes.

Figure 3:
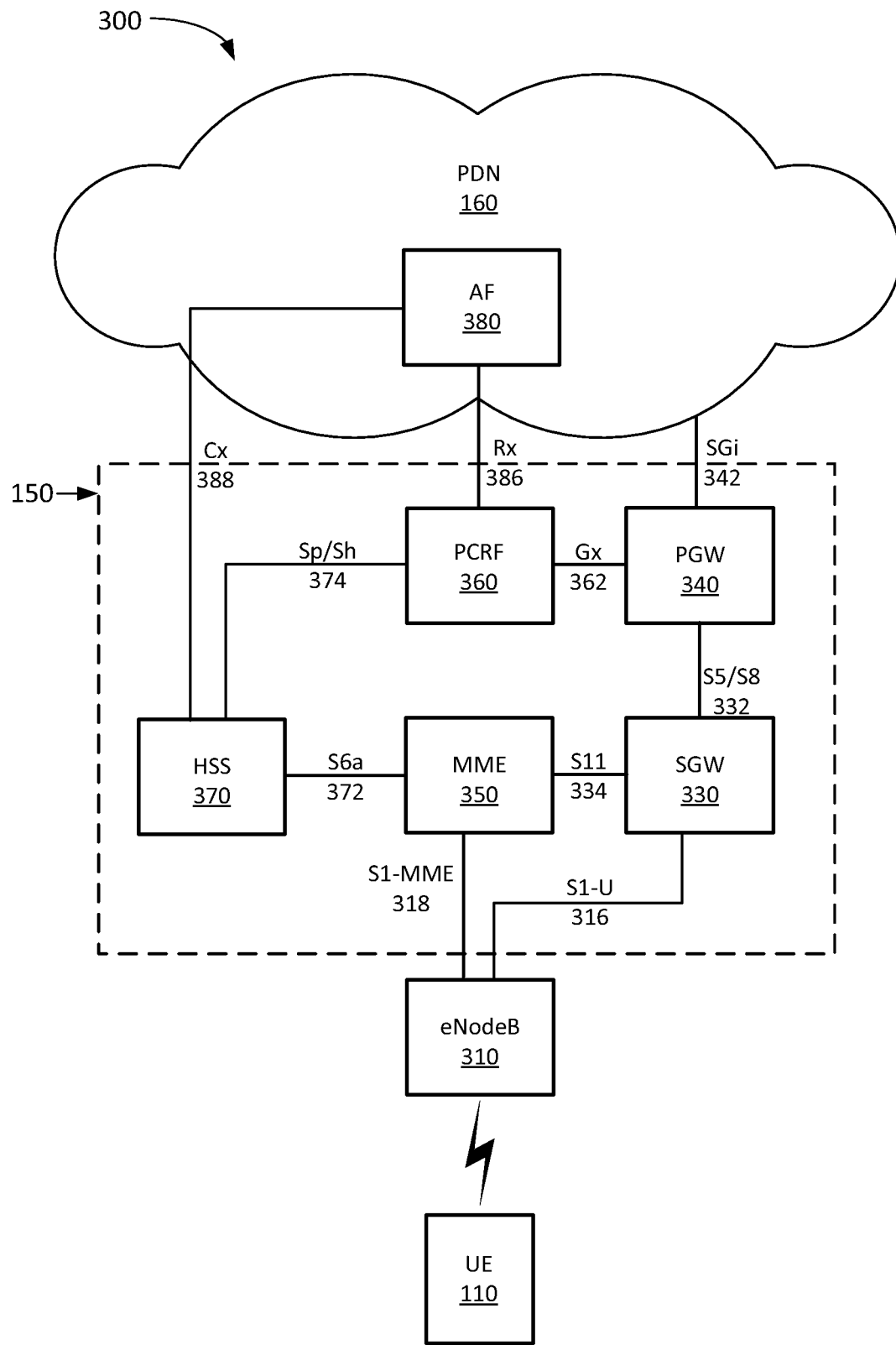
FIG. 3 is a diagram illustrating exemplary components of a Fourth Generation (4G) core network according to an implementation described herein.

FIG. 3 illustrates a system 300 that includes exemplary components of core network 150 that includes a 4G LTE core network according to an implementation described herein. As shown in FIG. 3, system 300 may include UE device 110, eNodeB 310, core network 150, and PDN 160. eNodeB 310 may correspond to, or be included in, base station 120. eNodeB 310 may communicate with UE device 110 using a 4G LTE air interface referred to as an Evolved Universal Mobile Telecommunications System (UMTS) Terrestrial Radio Access Network (E-UTRA) interface 312.

As shown in FIG. 3, core network 150 may include a Serving Gateway (SGW) 330, a Packet Data Network (PDN) Gateway (PGW) 340, a Mobility Management Entity (MME) 350, a Policy and Charging Rules Function (PCRF) 360, and a Home Subscriber Server (HSS) 370. While FIG. 3 depicts a single eNodeB 310, a single SGW 330, a single PGW 340, a single MME 350, a single PCRF 360, and a single HSS 370 for illustration purposes, in practice, system 300 may include multiple eNodeBs 310, multiple SGWs 330, multiple PGWs 340, multiple MMES 350, multiple PCRFs 360, and/or multiple HSSs 370.

eNodeB 310 may interface with core network 150 via an interface referred to as an S1 interface, which may include both a control plane S1-MME interface 318 and a data plane S1-U interface 316. S1-MME interface 318 may interface with MME 350. S1-MME interface 318 may be implemented, for example, with a protocol stack that includes a Non-Access Stratum (NAS) protocol and/or Stream Control Transmission Protocol (SCTP). An S1-U interface 316 may interface with SGW 330 and may be implemented, for example, using General Packet Radio Service (GPRS) Tunneling Protocol version 2 (GTPv2).

SGW 330 may provide an access point to and from UE device 110, may handle forwarding of data packets for UE device 110, and may act as a local anchor point during handover procedures between different eNodeBs 310. SGW 330 may interface with PGW 340 through an S5/S8 interface 332. S5/S8 interface 332 may be implemented, for example, using GTPv2. PGW 340 may function as a gateway to IP network 301 through an SGi interface 342. A particular UE device 110, while connected to a single SGW 330, may be connected to multiple PGWs 340, one for each data network (e.g., PDN 160) with which UE device 110 communicates. For example, a particular PGW 340 may be associated with a particular APN and UE device 110 may connect to the particular APN by connecting to the PGW 340 associated with the particular APN. Thus, UE device 110 may be connected to one or more APNs at a particular time. PGW 340 may be configured by PCRF 360 to send a PCO message to UE device 110 via MME 350 with an indication that UE device 110 is connected to MEC network 140 and is using a MEC service available via MEC network 140.

MME 350 may implement control plane processing for core network 150. For example, MME 350 may manage the mobility of UE device 110, implement tracking and paging procedures for UE device 110, activate and deactivate bearers for UE device 110, authenticate a user of UE device 110, and/or interface to non-LTE radio access networks. A bearer may represent a logical channel with particular QoS requirements. MME 350 may also select a particular SGW 330 for a particular UE device 110.

MME 350 may communicate with SGW 330 through an S11 interface 334. S11 interface 334 may be implemented, for example, using GTPv2. S11 interface 334 may be used to create and manage a new session for a particular UE device 110. S11 interface 334 may be activated when MME 350 needs to communicate with SGW 330, such as when the particular UE device 110 attaches to core network 150, when bearers need to be added or modified for an existing session for the particular UE device 110, when a connection to a new PGW 340 needs to be created, or during a handover procedure (e.g., when the particular UE device 110 needs to switch to a different SGW 330).

PCRF 360 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF 360 may communicate with PGW 340 through a Gx interface 362. Gx interface 362 may be implemented, for example, using Diameter protocol. Furthermore, PCRF 360 may install a policy in PGW 340 to send a PCO message to UE device 110 via MME 350 with an indication that UE device 110 is connected to MEC network 140 and is using a MEC service available via MEC network 140.

HSS 370 may store subscription information associated with UE devices 110 and/or information associated with users of UE devices 110. For example, HSS 370 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. HSS 370 may communicate with MME 350 through an S6a interface 372. S6a interface 372 may be implemented, for example, using a Diameter protocol. HSS 370 may communicate with PCRF device 360 using an Sp/Sh interface 374. AF 380 may provide an enterprise policy to PCRF 360. AF 380 may communicate with PCRF 360 through an Rx interface 386 and may communicate with HSS 350 through a Cx interface 388. Rx interface 386 and Cx interface 388 may be implemented, for example, using Diameter protocol.

Although FIG. 3 shows exemplary components of core network 150, in other implementations, core network 150 may include fewer components, different components, differently arranged components, or additional components than depicted in FIG. 3. Additionally, or alternatively, one or more components of core network 150 may perform functions described as being performed by one or more other components of core network 150.

Figure 4:
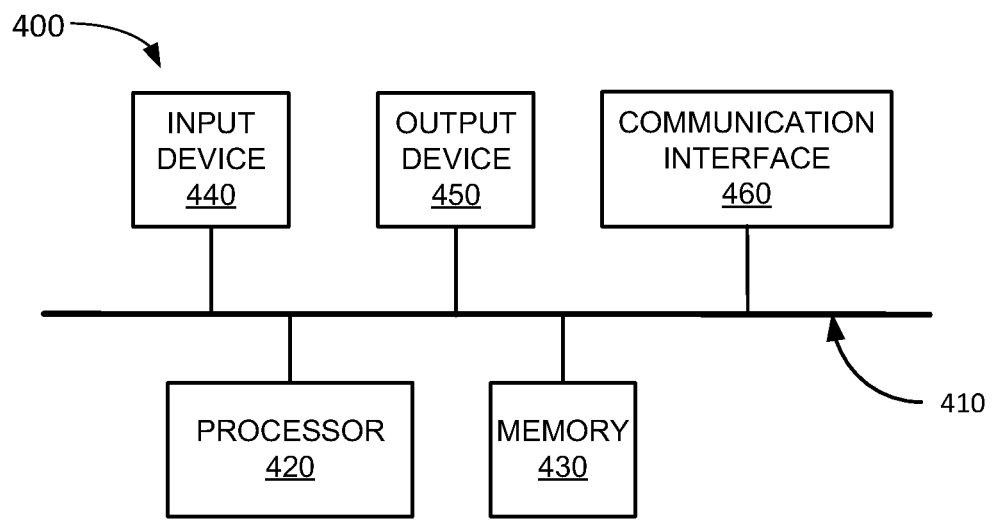
FIG. 4 is a diagram illustrating exemplary components of a device that may be included in a component of an environment according to an implementation described herein.

FIG. 4 illustrates example components of a device 400 according to an implementation described herein. UE device 110, MEC device 145, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, eNodeB 310, SGW 330, PGW 340, MME 350, PCRF device 360, HSS 370, AF 380, and/or other components of core network 150, may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to RF signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to generating and/or detecting an indication of an active MEC session and/or activating a MEC indicator on a user interface. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
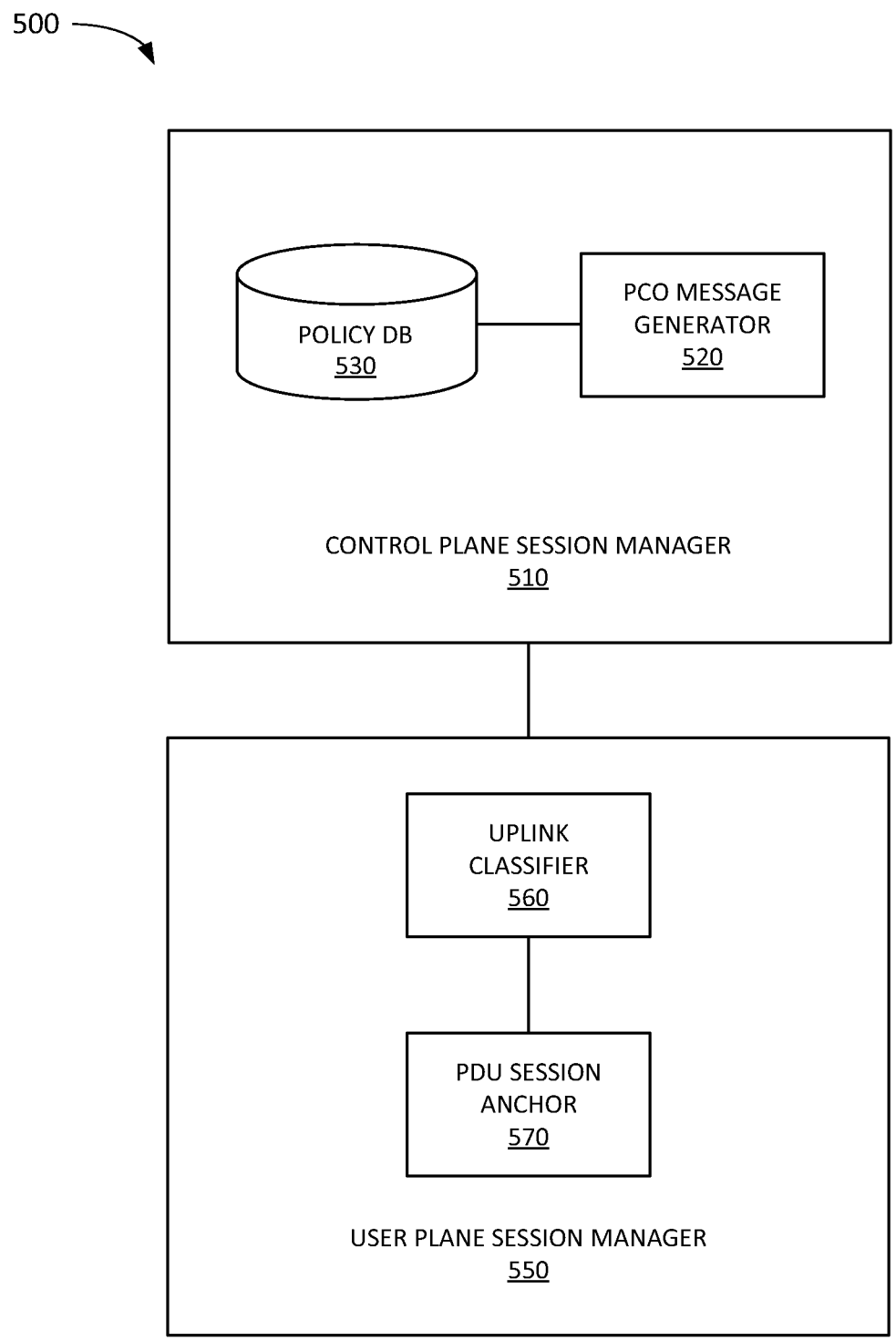
FIG. 5 is a diagram illustrating exemplary components of network devices configured to indicate the presence of a multi-access edge computing (MEC) session according to an implementation described herein.

FIG. 5 is a diagram illustrating exemplary components of a system 500 that may be included in core network 150. The components of system 500 may be implemented, for example, via processor 420 executing instructions from memory 430. Alternatively, some or all of the components of system 500 may be implemented via hard-wired circuitry. As shown in FIG. 5, system 500 may include a control plane session manager 510 and a user plane session manager 520.

Control plane session manager 510 may manage the control plane of a communication session for UE device 110 in core network 150. If core network 150 includes a 5G core network, control plane session manager 510 may be implemented in SMF 240. If core network 150 includes a 4G core network, control plane session manager 510 may be implemented in PGW 340. Control plane session manager 510 may include a PCO message generator 520 and a policy database (DB) 530. PCO message generator 520 may generate a 4G PCO or a 5G ePCO message based on the policies stored in policy DB 530. If core network 150 includes a 5G core network, the policies may be provided by PCF 254. If core network 150 includes a 4G core network, the policies may be provided by PCRF 360. Policy DB 530 may include a policy to include an instruction in a PCO message to activate a MEC indicator if a communication session is being routed to MEC network 140. PCO message generator 520 may generate a PCO message that includes the instruction to activate a MEC indicator if a MEC session is detected and may send the PCO to UE device 110.

User plane session manager 550 may manage the user plane of a communication session for UE device 110 in core network 150. If core network 150 includes a 5G core network, control plane session manager 510 may be implemented in UPF 230. If core network 150 includes a 4G core network, control plane session manager 510 may be implemented in PGW 340. User plane session manager 550 may include an uplink classifier 560 and a session anchor 570. Uplink classifier 560 may classify uplink traffic PDUs from UE device 110 based on whether the PDUs should be routed to MEC network 140. For example, uplink classifier 560 may be configured by control plane session manager 510 with a list of identifiers (IDs) that should be classified as a MEC session. The IDs may include application labels, CoS IDs, subscriber group IDs, and/or other types of IDs that may be used to classify a PDU session as a MEC session. When uplink classifier 560 detects a MEC session, uplink classifier 560 may inform control plane session manager 510 that an active MEC session has been detected for UE device 110. Session anchor 570 may anchor a session (e.g., PDU session in 5G, bearer in 4G, etc.) and function as an intermediate routing destination for packets associated with a communication session. Packets associated with the communication session may be received by session anchor 570 and forwarded to a destination, such as MEC device 140.

Although FIG. 5 shows exemplary components of system 500, in other implementations, system 500 may include fewer components, different components, additional components, or differently arranged components than depicted in FIG. 5. Additionally, or alternatively, one or more components of system 500 may perform one or more tasks described as being performed by one or more other components of system 500.

Figure 6:
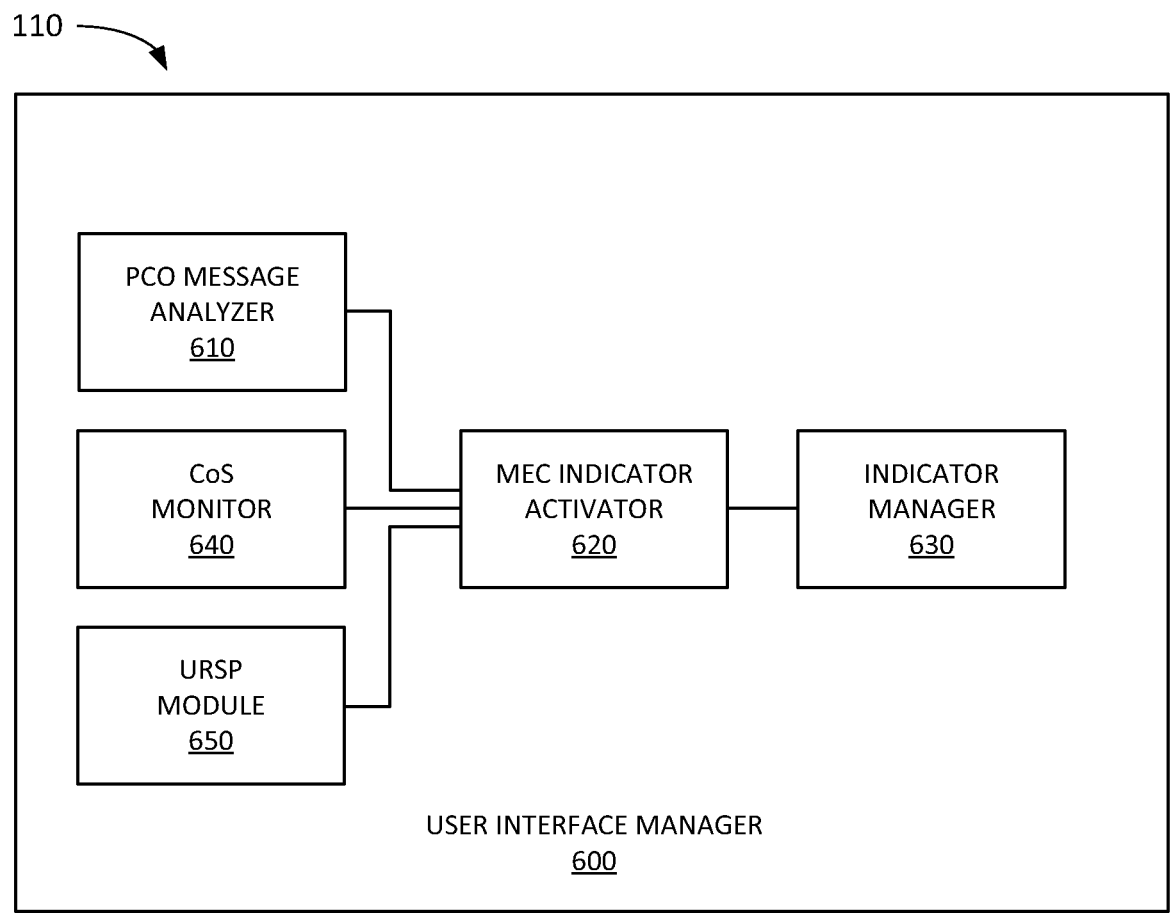
FIG. 6 is a diagram illustrating exemplary components of a user equipment device configured to indicate the presence of a MEC session according to an implementation described herein.

FIG. 6 is a diagram illustrating exemplary components of UE device 110. The components of UE device 110 may be implemented, for example, via processor 420 executing instructions from memory 430. Alternatively, some or all of the components of UE device 110 may be implemented via hard-wired circuitry. As shown in FIG. 6, UE device 110 may include a user interface manager 600. User interface manager 600 may manage the user interface of UE device 110.

User interface manager 600 may include a PCO message analyzer 610, a MEC indicator activator 620, and an indicator manager 630. In some implementations, user interface manager 600 may include CoS monitor 640 and/or a URSP module 650. PCO message analyzer 610 may analyze PCO/ ePCO messages received from core network 150 to determine whether a received PCO/ePCO message includes an indication that the communication session associated with the PCO/ePCO message corresponds to a MEC session. PCO message analyzer 610 may inform MEC indicator activator 620 that UE device 110 is associated with an active MEC session.

MEC indicator activator 620 may activate a MEC indicator. For example, MEC indicator activator 620 may instruct indicator manager 630 to activate a MEC icon, modify another status icon, generate an audible indication, generate a haptic indication, and/or otherwise modify the user interface of UE device 110 to inform the user that UE device 110 is associated with an active MEC session. In some implementations, MEC indicator activator 620 may enable a user to select a particular type of MEC indicator and/or to select a particular type of MEC indicator based on another setting configured for UE device 110. For example, if UE device 110 includes a setting indicating the user of UE device 110 is visually impaired, MEC indicator activator 620 may select an audible indication, such as an audible message that a MEC session is active, and/or a haptic indication using a vibration actuator included in UE device 110.

In some implementations, MEC indicator activator 620 may activate the MEC indicator if at least one running application is associated with a MEC session. In other implementations, MEC indicator activator 620 may activate the MEC indicator if an application associated with a MEC session is in the foreground of the user interface (e.g., a user interface of the application is being displayed by UE device 110) and deactivate the MEC indicator if the application associated with the MEC session is moved to the background or minimized by the user.

CoS monitor 640 may monitor CoS IDs associated with communication sessions. If CoS monitor 640 detects a CoS ID associated with MEC network 140, CoS monitor 640 may inform MEC indicator activator 620 that UE device 110 is associated with an active MEC session. URSP module 650 may select a destination for PDU sessions based on a URSP associated with particular applications and/or types of PDU sessions. The URSP may store a route selection profile for particular types of communication sessions. For example, for a particular application ID, CoS ID, subscriber group ID, and/or another type of ID associated with a communication session, the URSP may store a DNN, APN, a network slice ID, and/or another type of network destination information to which communication sessions associated with the ID should be routed. If URSP module 650 selects MEC network 140 as the destination for a PDU session, URSP module 650 may inform MEC indicator activator 620 that UE device 110 is associated with an active MEC session.

Although FIG. 6 shows exemplary components of UE device 110, in other implementations, UE device 110 may include fewer components, different components, additional components, or differently arranged components than depicted in FIG. 6. Additionally, or alternatively, one or more components of UE device 110 may perform one or more tasks described as being performed by one or more other components of UE device 110.

Figure 7:
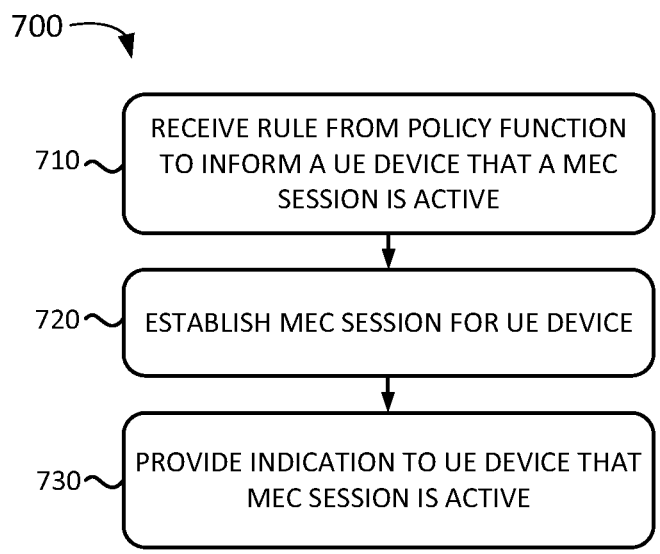
FIG. 7 illustrates a flowchart for providing an indication to a user equipment device of the presence of a MEC session according to an implementation described herein.

FIG. 7 illustrates a flowchart of a process 700 for indicating to a user the presence of a multi-access edge computing session according to an implementation described herein. In some implementations, process 700 of FIG. 7 may be performed by SMF 240, PGW 240, and/or another device in core network 150. In other implementations, some or all of process 700 may be performed by another device or a group of devices separate from SMF 240 and/or PGW 240.

As shown in FIG. 7, process 700 may include receiving a rule from a policy function to inform a UE device that a MEC session is active (block 710). As an example, PCF 254 may install a policy in SMF 240 to add data or information in an ePCO message to indicate that a PDU session is being routed to MEC network 140, if SMF 240 determines that the PDU session is being routed to MEC network 140. As another example PCRF 360 may install a policy in PGW 340 to add an indication to a PCO message that a bearer is being routed to MEC network 140, if PGW 340 determines that the bearer is being routed to MEC network 140.

Process 700 may further include establishing a MEC session for a UE device (block 720) and providing an indication to the UE device that a MEC session is active (block 730). As an example, in a 5G network, UPF 230 may inform SMF 240 that uplink classifier 560 is routing a PDU session from UE device 110 to MEC network 140. In response, SMF 240 may determine, based on information stored in policy DB 530, that an ePCO message should be sent to UE device 110 associated with the MEC session with an indication that UE device 110 should activate a MEC indicator on the user interface. SMF 240 may send the ePCO message to UE device 110 via AMF 220. As another example, in a 4G network, PGW 340 may determine that a PDU session from UE device 110 is being routed to MEC network 140 and, in response to a policy installed by PCRF 360, send a PCO message to UE device 110 via MIME 350 with an indication that UE device 110 should activate a MEC indicator on the user interface. As yet another example, a PDU associated with a MEC session may be assigned a MEC CoS ID by SMF 240. PDUs associated with the MEC session may be received by UE device 110 and UE device 110 may determine to activate the MEC indicator based on the MEC CoS ID.

In some implementations, SMF 240 (or PGW 340) may be configured to determine whether to send the ePCO/PCO message with the indication to activate the MEC indicator using additional information. For example, SMF 240 or PGW 340 may determine and use the location of UE device 110, a latency value associated with the communication session, an application ID associated with the communication session, and/or other types of information to determine whether UE device 110 is associated with an active MEC session and whether to send the indication to activate the MEC indicator to UE device 110.

Figure 8:
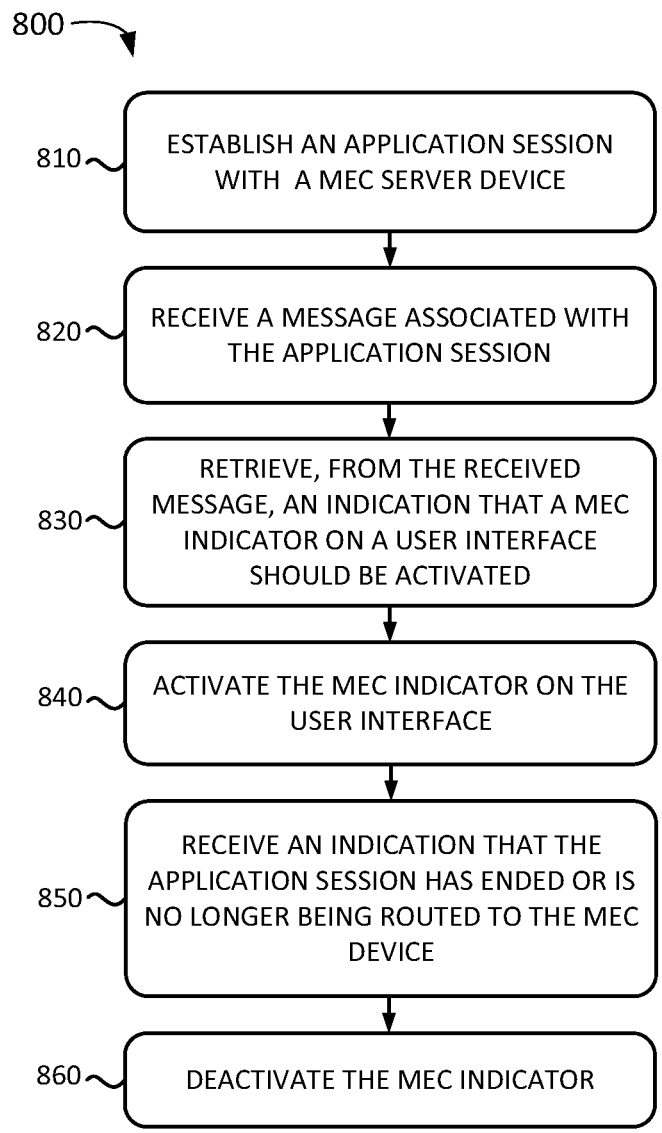
FIG. 8 illustrates a flowchart for indicating to a user the presence of a MEC session according to an implementation described herein.

FIG. 8 illustrates a flowchart 800 for indicating to a user the presence of a multi-access edge computing session according to an implementation described herein. In some implementations, process 800 of FIG. 8 may be performed by UE device 110. In other implementations, some or all of process 800 may be performed by another device or a group of devices separate from UE device 110.

As shown in FIG. 8, process 800 may include establishing an application session with a MEC server device (block 810). For example, an application running on UE device 110 may request a communication session with a server device via base station 120. The communication session may be established by core network 150 and routed to MEC device 145 in MEC network 140. The application running on UE device 110 may not be aware that it is communicating with MEC device 145, rather than a server device in PDN 160.

Process 800 may further include receiving a message associated with the application session (block 820), retrieving, from the received message, an indication that a MEC indicator on a user interface should be activated (block 830), and activating the MEC indicator on the user interface (block 840). As an example, UE device 110 may receive, from core network 150, a PCO or ePCO message associated with the application session, which includes a field, referred to as a container, which includes an indication that a MEC indicator should be activated. As another example, UE device 110 may determine that PDU sessions associated with the application sessions include a MEC CoS ID. As yet another example, UE device 110 may receive a message from URSP module 650 that URSP module 650 has routed the application session to MEC network 140. In response to the message, UE device 110 may activate a MEC indicator to inform the user that UE device 110 is using a MEC service. For example, UE device 110 may generate a MEC icon, modify an icon already being displayed, and/or otherwise modify the user interface of UE device 110 to indicate that UE device 110 is using a MEC service.

Process 800 may further include receiving an indication that the application session has ended or is no longer being routed to the MEC device (block 850) and deactivating the MEC indicator (block 860). As an example, UE device 110 may receive another PCO or ePCO message from core network 150, indicating the MEC session has ended and that the MEC indicator should be deactivated. As another example, UE device 110 may determine that the application session has ended or that PDUs associated with the application session no longer include the MEC CoS ID. As yet another example, UE device 110 may receive a message from URSP module 650 that URSP module 650 is no longer routing the application session to MEC network 140. In response to the determination, UE device 110 may deactivate a MEC indicator to inform the user that UE device 110 is no longer using a MEC service. In some implementations, UE device 110 may deactivate the MEC indicator if the application associated with the MEC session is moved to the background or minimized.

Figure 9A:
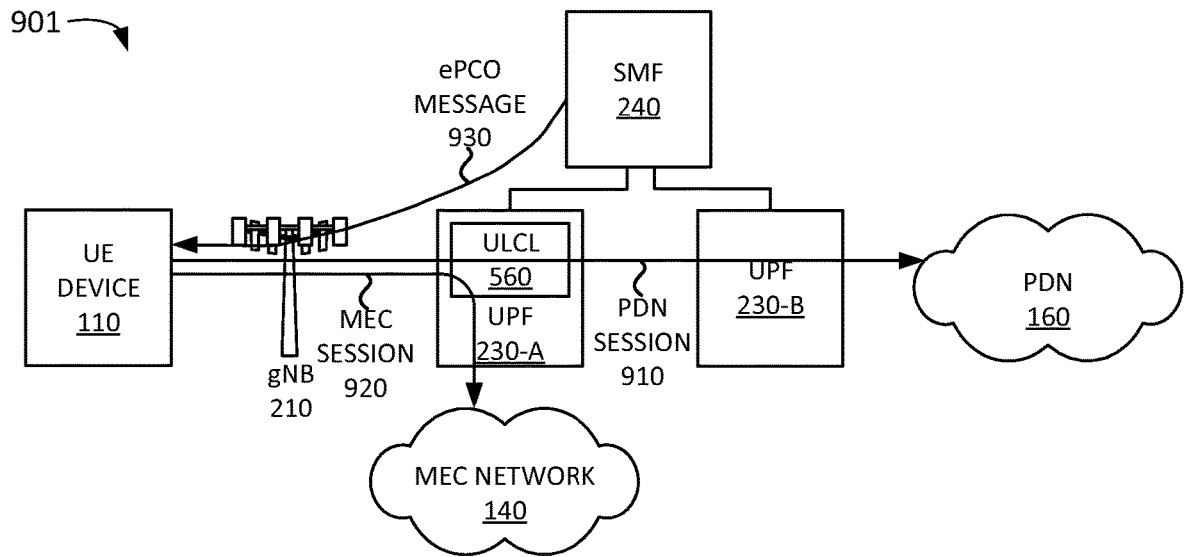
FIGS. 9A, 9B, and 9C are diagrams illustrating exemplary architectures that include a MEC network according to an implementation described herein.

FIG. 9A illustrates an exemplary architecture 901 that includes MEC network 140. Architecture 901 implements a local breakout architecture in which MEC traffic "breaks out" of other traffic from UE device 110. As shown in FIG. 9A, architecture 901 includes UPF 230-A, which includes uplink classifier (ULCL) 560 that classifies uplink traffic PDUs from UE device 110 based on whether the PDUs should be routed to MEC network 140. Thus, uplink traffic for PDN session 910 (e.g., normal Internet traffic) to PDN 160 may be routed through to UPF 230-B, which functions as a gateway for PDN 160. Uplink traffic for MEC session 920 is intercepted and routed by ULCL 560 to UPF 230-A, which functions as a gateway to MEC network 140. SMF 240 may manage UPF 230-A and UPF 230-B. When UPF 230-A informs SMF 240 that a MEC session is active between UE device 110 and MEC network 140, SMF 240 may send an ePCO message 930 to UE device 110 with an instruction to activate a MEC indicator. When the MEC session ends, SMF 240 may send another ePCO message to UE device 110 with an instruction to deactivate a MEC indicator.

Figure 9B:
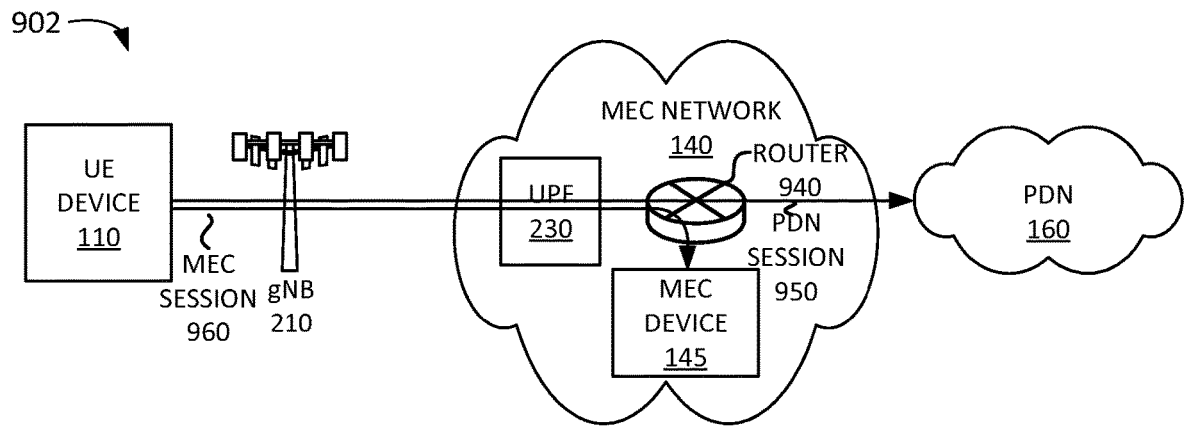

FIG. 9B illustrates another exemplary architecture 902 that includes MEC network 140. Architecture 902 implements a distributed anchor point architecture in which all uplink traffic from UE device 110 travels through MEC network 140 and in which the MEC traffic is offloaded in MEC network 140, and non-MEC traffic follows a backhaul link to core network 150 (not shown in FIG. 9B) and PDN 160. As shown in FIG. 9B, architecture 902 includes UPF 230, which functions as a gateway for MEC network 140. Furthermore, MEC network 140 includes a transport network routing device in MEC network 140, such as router 940, which routes uplink traffic for MEC session 960 to MEC device 145 and uplink traffic for PDU session 950 to PDN 160.

In some implementations, UPF 230 may send an ePCO message to UE device 110 with an instruction to activate a MEC indicator if the communication session is routed to MEC device 14. In other implementations, UE device 110 may be configured to monitor active sessions for a particular ID, such as a MEC CoS ID, and may activate a MEC indicator on the user interface when a PDU session associated with the MEC CoS ID is detected.

Figure 9C:
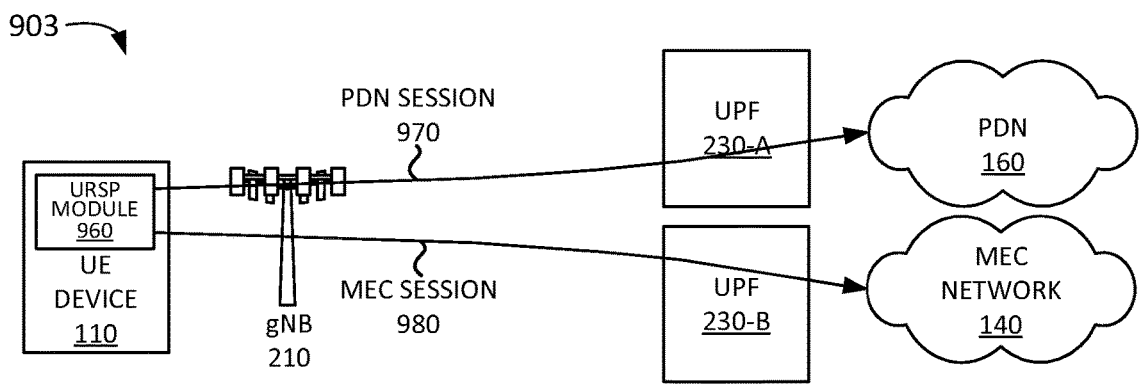

FIG. 9C illustrates another exemplary architecture 903 that includes MEC network 140. Architecture 903 implements a separate PDU session architecture in which traffic filtering for MEC sessions happens in UE device 110. As shown in FIG. 9C, UE device 110 includes URSP module 960. URSP module 960 includes a URSP for MEC network 140 that includes a policy for which types of application sessions should be routed to MEC network 140. UPF 230-A may function as a gateway for PDN 160, and URSP module 960 may route non-MEC traffic, such as traffic for PDN session 970, to UPF 230-A. UPF 230-B may function as a gateway for MEC network 140 and URSP module 960 may route MEC traffic, such as traffic for MEC session 980, to UPF 930-B. URSP module 960 may inform MEC indicator activator 620 in UE device 110 that MEC session 980 is active and MEC indicator activator 620 may, in response, activate a MEC indicator on the user interface. In other implementations, URSP module 960 may route MEC and non-MC traffic to different network slices using different network slice IDs.

While FIGS. 9A-9C illustrate particular MEC architectures and particular mechanisms for instructing UE device 110 to activate a MEC indicator, any mechanism for instructing UE device 110 to activate a MEC indicator described herein may be used with any type of MEC architecture. For example, any of a local breakout MEC architecture, a distributed anchor point MEC architecture, and/or a separate PDU session MEC architecture based on a URSP, may use one or more of a method of sending ePCO/PCO messages to instruct UE device 110 to activate the MEC indicator, a method to activate the MEC indicator in response to detecting a communication session with a MEC CoS ID, and/or a method to activate the MEC indicator in response to receiving an indication from URSP module 960 that a communication session is being routed to MEC network 140.

Figure 10:
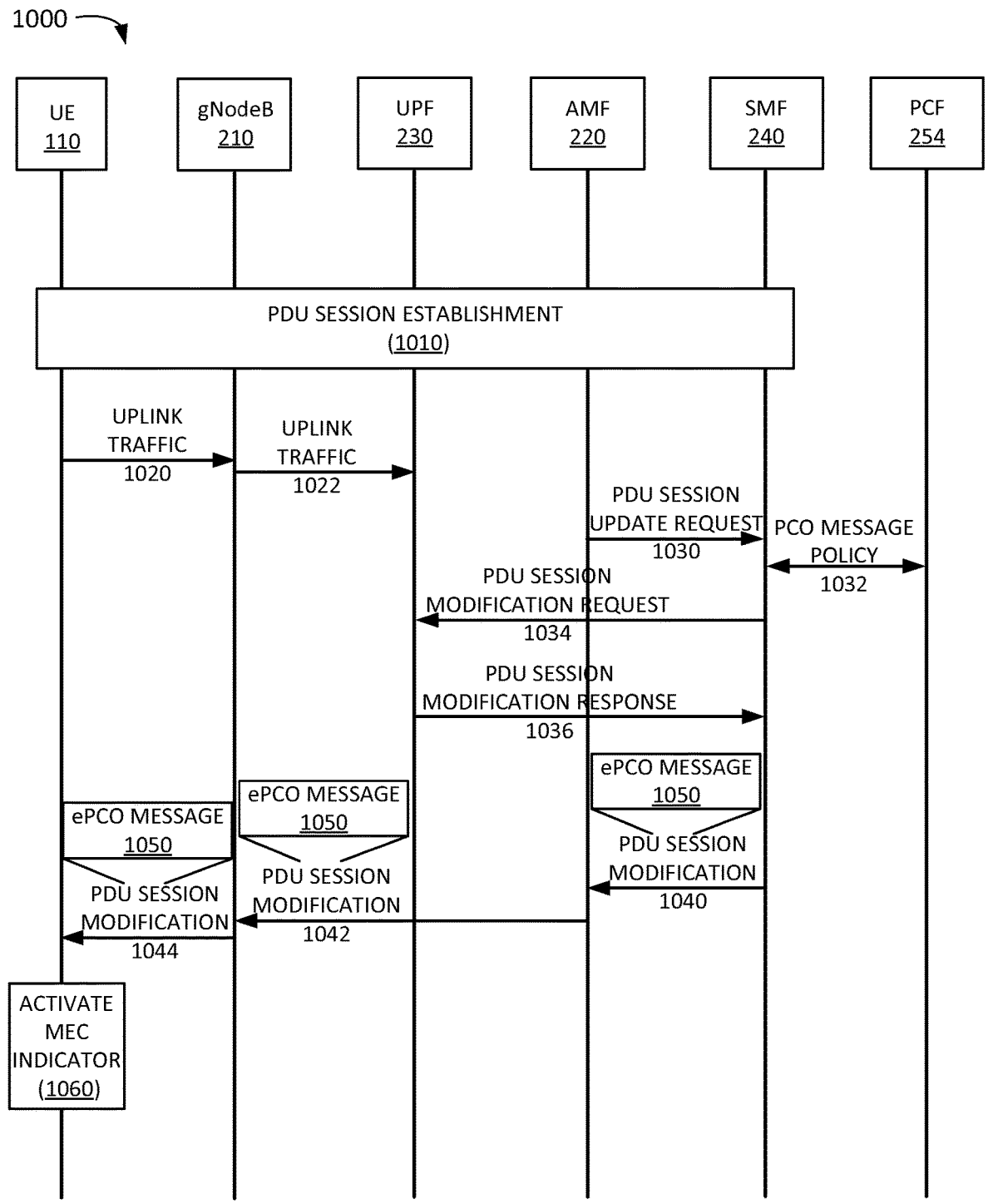
FIG. 10 illustrates an exemplary signal flow according to an implementation described herein.

FIG. 10 illustrates an exemplary signal flow 1000 according to an implementation described herein. As shown in FIG. 10, signal flow 1000 may include a PDU session establishment procedure (block 1010). The PDU session establishment procedure may include UE device 110 sending a PDU Session Request to AMF 220 via gNodeB 210. AMF 220 may send a PDU Session Request to SMF 240, and SMF 240 may respond with a PDU Session Response. SMF 240 may then send a PDU Session Establishment message to UPF 230 and UPF 230 may respond with a PDU Session Establishment Response. SMF 240 may then send a PDU Session Setup Complete message to AMF 220 and AMF 220 may send a PDU Session Accept message to UE device 110 via gNodeB 210.

UE device 110 may then initiate the sending of uplink traffic to UPF 230 via gNodeB 210 (signals 1020 and 1022). Uplink classifier 560 in UPF 230 may route the uplink traffic to MEC network 130 (not shown in FIG. 10) based on an application label, a CoS ID, and/or other types of information that indicate that the uplink traffic associated with the communication session should be directed to MEC network 140. AMF 220 may send a PDU session update request to SMF 240 (signal 1030). SMF 240 may communicate with PCF 254 after receiving the PDU session update request to request policies for the PDU session (signal 1032). PCF 254 sending an ePCO message policy to SMF 240 (signal 1032). The ePCO policy may include an instruction to send an ePCO message to UE device 110 when SMF 240 detects an active MEC session between UE device 110 and MEC network 140. SMF 240 may send a PDU session modification request to UPF 230 (signal 1034) and UPF 230 may respond with a PDU session modification response (signal 1036) that includes an indication that the communication session is being routed to MEC network 140.

In response, SMF 240 may apply the ePCO message policy received from PCF 254, generate an instruction to activate a MEC indicator, and add the generated instruction into an ePCO message 1050 to be included in a PDU session modification message to be sent to UE device 110 via AMF 220 and gNodeB 210 (signals 1040, 1042 and 1044). UE device 110 may receive the ePCO message included in the PDU session modification message and my determine whether the ePCO message includes an instruction to activate a MEC indicator. After determining that the ePCO message includes the instruction to activate the MEC indicator, UE device 110 may activate the MEC indicator (block 1060) by, for example, displaying a MEC icon, modifying another status icon being displayed, and/or otherwise modifying the user interface to inform the user that UE device 110 is using a MEC service.

Figure 11A:
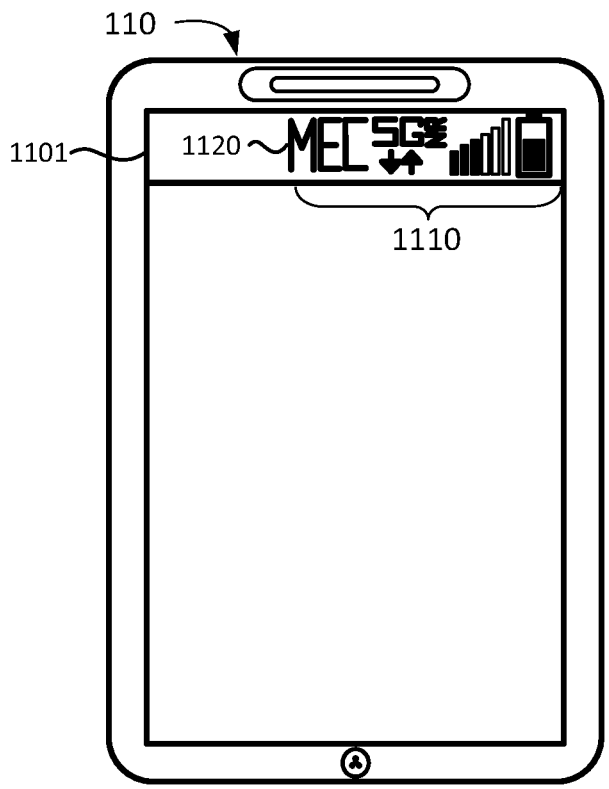
FIGS. 11A 11B, and 11C are diagrams of exemplary user interfaces according to an implementation described herein.

FIG. 11A is a diagram of an exemplary user interface 1101 that generates/displays a MEC icon whenever UE device 110 is associated with an active connection to MEC network 140. As shown in FIG. 11A, UE device 110 may include a user interface 1101 generated by a display device of UE device 110, such as a touchscreen. User interface 1101 may include a status icon area 1110 that includes status icons, such as, for example, a battery level icon, a signal strength icon, and a RAT type icon. Furthermore, status icon area 1110 may include a MEC icon 1120. MEC icon 1120 may be displayed when UE device 110 detects that an application running on UE device 110 is associated with an active connection to MEC network 140. MEC icon 1120 may be deactivated once the connection to MEC network 140 is ended.

Figure 11B:
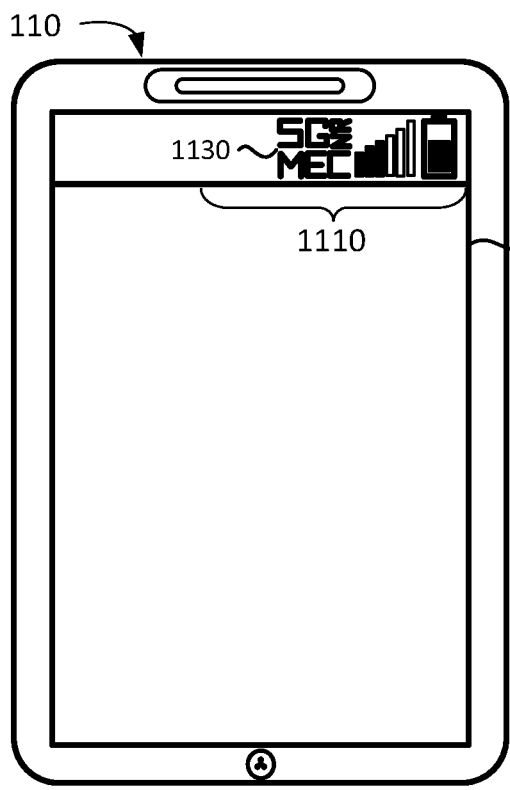

FIG. 11B is a diagram of another exemplary user interface 1102 that modifies a status icon whenever UE device 110 is associated with an active connection to MEC network 140. As shown in FIG. 11B, UE device 110 may include a user interface 1102 generated by a display device of UE device 110, such as a touchscreen. User interface 1102 may include a status icon area 1110 that includes status icons, such as, for example, a battery level icon, a signal strength icon, and a RAT type icon 1130. RAT icon 1130 may be modified to provide an indication of an active MEC connection when UE device 110 detects that an application running on UE device 110 is associated with an active connection to MEC network 140. RAT icon 1130 may be modified to no longer display the indication of an active MEC connection once the connection to MEC network 140 is ended.

Figure 11C:
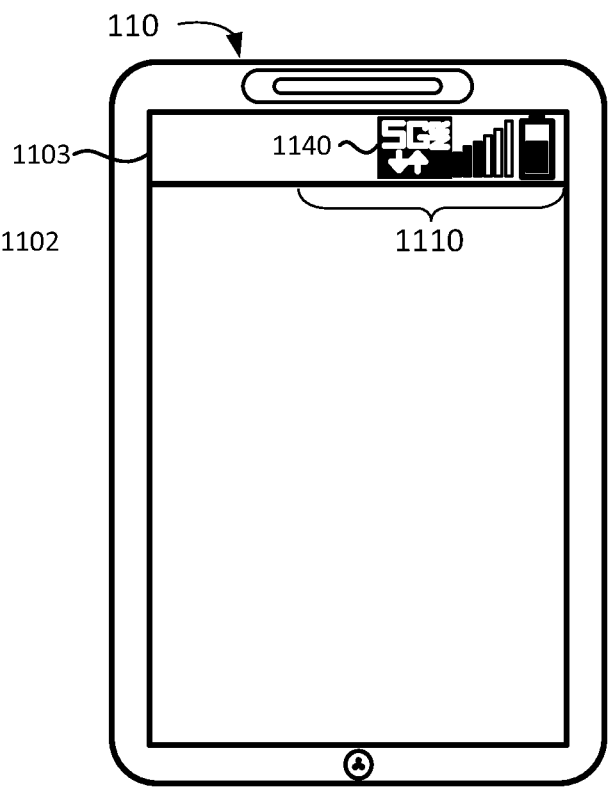

FIG. 11C is a diagram of yet another exemplary user interface 1103 that modifies a status icon whenever UE device 110 is associated with an active connection to MEC network 140. As shown in FIG. 11C, RAT icon 1130 may be modified to change the background color of the icon when UE device 110 detects that an application running on UE device 110 is associated with an active connection to MEC network 140. RAT icon 1130 may be modified back to the normal background color once the connection to MEC network 140 is ended.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signals have been described with respect to FIG. 10, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
 establishing, by a user equipment (UE) device, an application session with a multi-access edge computing (MEC) device via a base station;
 receiving, by the UE device, a message associated with the application session;
 retrieving, by the UE device and from the received message, an instruction to activate a MEC indicator on a user interface of the UE device, wherein the MEC indicator indicates that a MEC application session is active on the UE device;
 activating, by the UE device, the MEC indicator on the user interface of the UE device, in response to retrieving the instruction, wherein activating the MEC indicator includes displaying a new icon or modifying an already displayed icon from a first state to a second state;
 receiving, by the UE device, an indication that the application session has ended or is no longer being routed to the MEC device; and
 deactivating, by the UE device, the MEC indicator, in response to receiving the indication that the application session has ended or is no longer being routed to the MEC device, wherein deactivating the MEC indicator includes ceasing to display the new icon or modifying the already displayed icon from the second state to the first state.

2. The method of claim 1, wherein the message includes a Protocol Configuration Options (PCO) message.

3. The method of claim 2, wherein retrieving the instruction to activate the MEC indicator on the user interface of the UE device includes:
 determining that a particular field of the PCO message includes the indication.

4. The method of claim 1, wherein retrieving the instruction to activate the MEC indicator on the user interface of the UE device includes:
 identifying a Class of Service (CoS) associated with the application session; and
 determining that the identified CoS corresponds to a MEC CoS.

5. The method of claim 1, wherein activating the MEC indicator on the user interface of the UE device includes:
 generating the new icon, wherein the new icon indicates that the MEC application session is active on the UE device.

6. The method of claim 1, wherein activating the MEC indicator on the user interface of the UE device includes:
 modifying the already displayed icon from the first state to the second state to indicate that the MEC application session is active on the UE device.

7. The method of claim 6, wherein modifying the already displayed icon from the first state to the second state includes at least one of:
 changing a foreground color of the displayed icon,
 changing a background color of the displayed icon,
 adding a border to the displayed icon, or
 making the displayed icon blink.

8. The method of claim 1, wherein receiving the message associated with the application session includes:
 receiving the message from a Session Management Function (SMF) via the base station, wherein the SMF is associated with a User Plane Function (UPF) that routes traffic associated with the application session to the MEC device.

9. The method of claim 1, wherein receiving the message associated with the application session includes:
 receiving the message from a device in a MEC network that includes the MEC device.

10. The method of claim 1, wherein receiving the message associated with the application session includes:
 receiving the message from a UE route selection profile (URSP) module, wherein the URSP module has selected a data network name (DNN) or a network slice associated with the MEC device for the application session.

11. A user equipment (UE) device comprising:
 a processor configured to:
  establish an application session with a multi-access edge computing (MEC) device via a base station;
  receive a message associated with the application session;
  retrieve, from the received message, an instruction to activate a MEC indicator on a user interface of the UE device, wherein the MEC indicator indicates that a MEC application session is active on the UE device; and
  activate the MEC indicator on the user interface of the UE device, in response to retrieving the instruction, wherein activating the MEC indicator includes displaying a new icon or modifying an already displayed icon from a first state to a second state;
  receive an indication that the application session has ended or is no longer being routed to the MEC device; and
  deactivate the MEC indicator, in response to receiving the indication that the application session has ended or is no longer being routed to the MEC device, wherein deactivating the MEC indicator includes ceasing to display the new icon or modifying the already displayed icon from the second state to the first state.

12. The UE device of claim 11, wherein the message includes a Protocol Configuration Options (PCO) message, and wherein, when retrieving the instruction to activate the MEC indicator on the user interface of the UE device, the processor is further configured to:
 determine that a particular field of the PCO message includes the indication.

13. The UE device of claim 11, wherein, when retrieving the instruction to activate the MEC indicator on the user interface of the UE device, the processor is further configured to:
 identify a Class of Service (CoS) associated with the application session; and
 determine that the identified CoS corresponds to a MEC CoS.

14. The UE device of claim 11, wherein, when activating the MEC indicator on the user interface of the UE device, the processor is further configured to:
 generate the new icon, wherein the new icon indicates that the MEC application session is active on the UE device.

15. The UE device of claim 11, wherein, when activating the MEC indicator on the user interface of the UE device, the processor is further configured to:
  modify the already displayed icon from the first state to the second state to indicate that the MEC application session is active on the UE device.

16. The UE device of claim 11, wherein, when receiving the message associated with the application session, the processor is further configured to:
  receive the message from a Session Management Function (SMF) via the base station, wherein the SMF is associated with a User Plane Function (UPF) that routes traffic associated with the application session to the MEC device.

17. The UE device of claim 11, wherein, when receiving the message associated with the application session, the processor is further configured to:
  receive the message from a device in a MEC network that includes the MEC device.

18. The UE device of claim 11, wherein, when receiving the message associated with the application session, the processor is further configured to:
  receive the message from a UE route selection profile (URSP) module, wherein the URSP module has selected a data network name (DNN) or a network slice associated with the MEC device for the application session.

19. A non-transitory computer-readable memory device storing instructions executable one a processor, the non-transitory computer-readable memory device comprising:
  one or more instructions to establish an application session with a multi-access edge computing (MEC) device via a base station;
  one or more instructions to receive a message associated with the application session;
  one or more instructions to retrieve, from the received message, an instruction to activate a MEC indicator on a user interface of the UE device, wherein the MEC indicator indicates that a MEC application session is active on the UE device; and
  one or more instructions to activate the MEC indicator on the user interface of the UE device, in response to retrieving the instruction, wherein activating the MEC indicator includes displaying a new icon or modifying an already displayed icon from a first state to a second state;
  one or more instructions to receive an indication that the application session has ended or is no longer being routed to the MEC device; and
  one or more instructions to deactivate the MEC indicator, in response to receiving the indication that the application session has ended or is no longer being routed to the MEC device, wherein deactivating the MEC indicator includes ceasing to display the new icon or modifying the already displayed icon from the second state to the first state.

20. The non-transitory computer-readable memory device of claim 19, wherein the message includes a Protocol Configuration Options (PCO) message, and wherein, the one or more instructions to retrieve the instruction to activate the MEC indicator on the user interface of the UE device include:
  one or more instructions to determine that a particular field of the PCO message includes the indication.

* * * * *